March 4, 1952 H. HOFMANN 2,587,619
PROCESS AND APPARATUS FOR THE PRODUCTION OF
SYNTHETIC THREAD
Filed Feb. 12, 1947 11 Sheets-Sheet 1
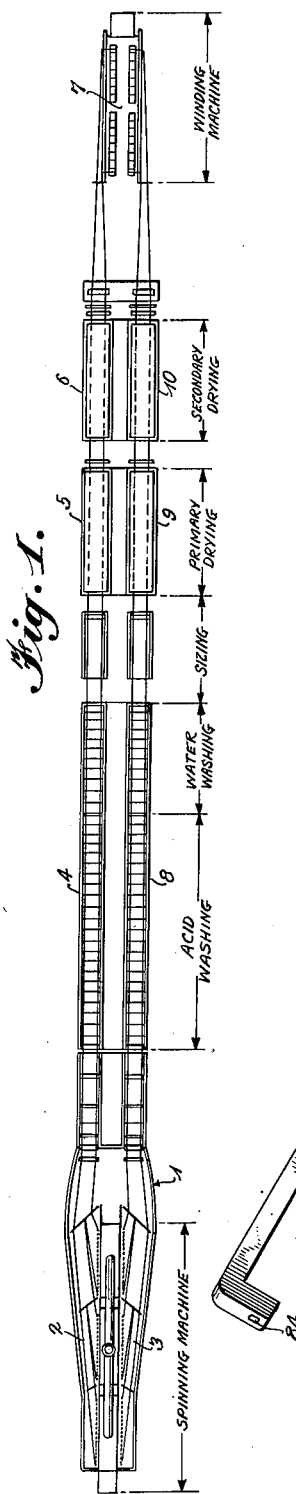
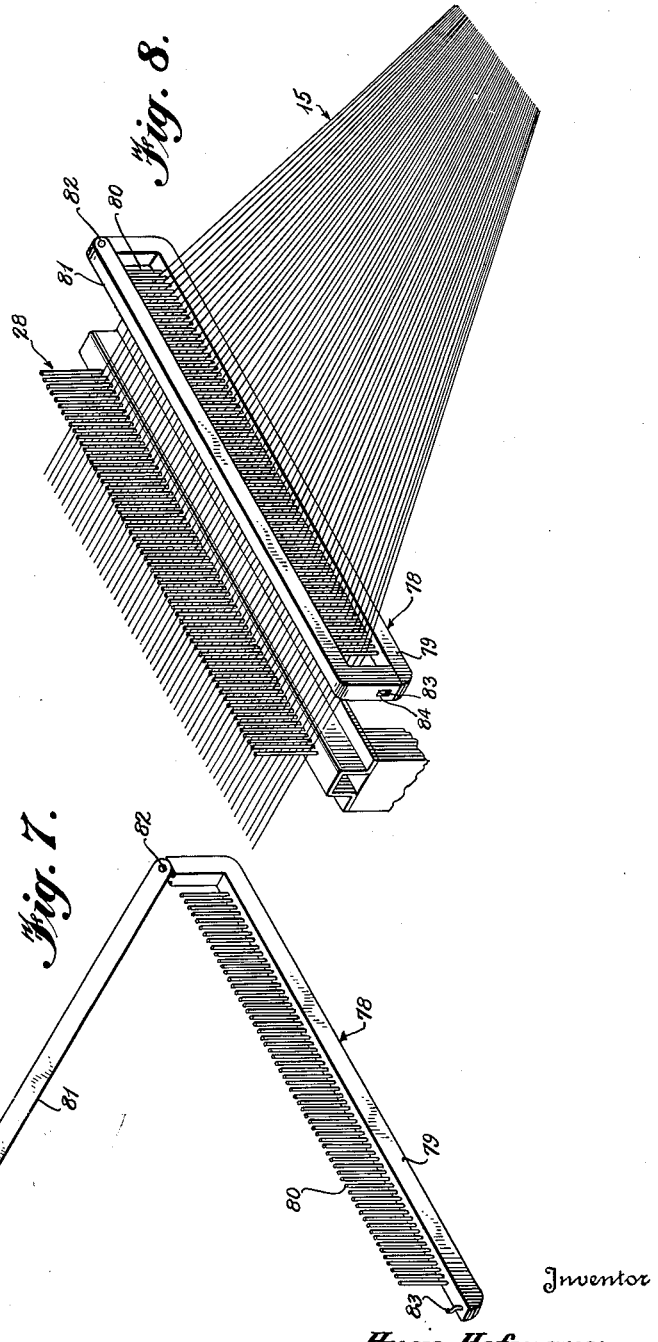
Inventor
Hugo Hofmann

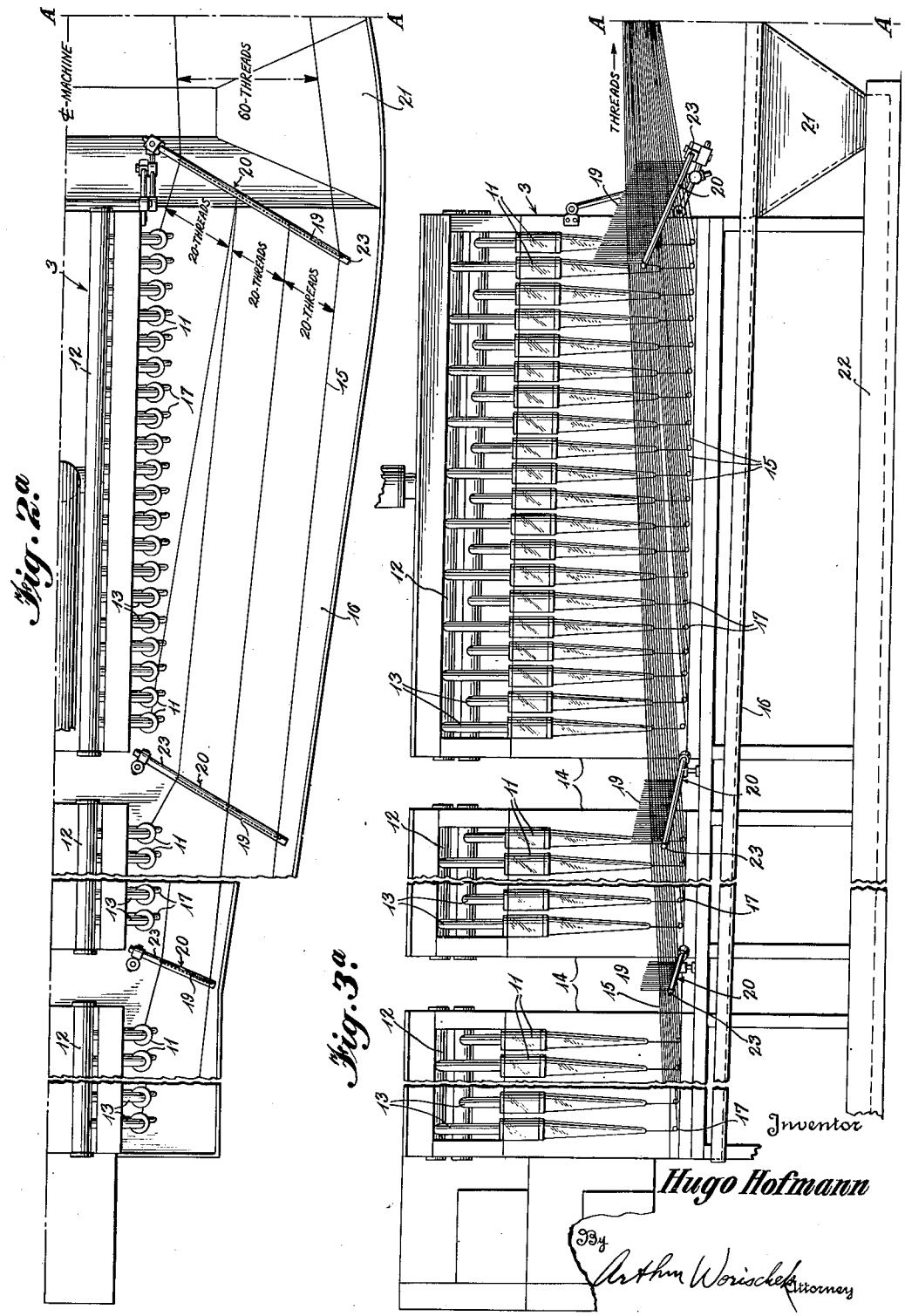

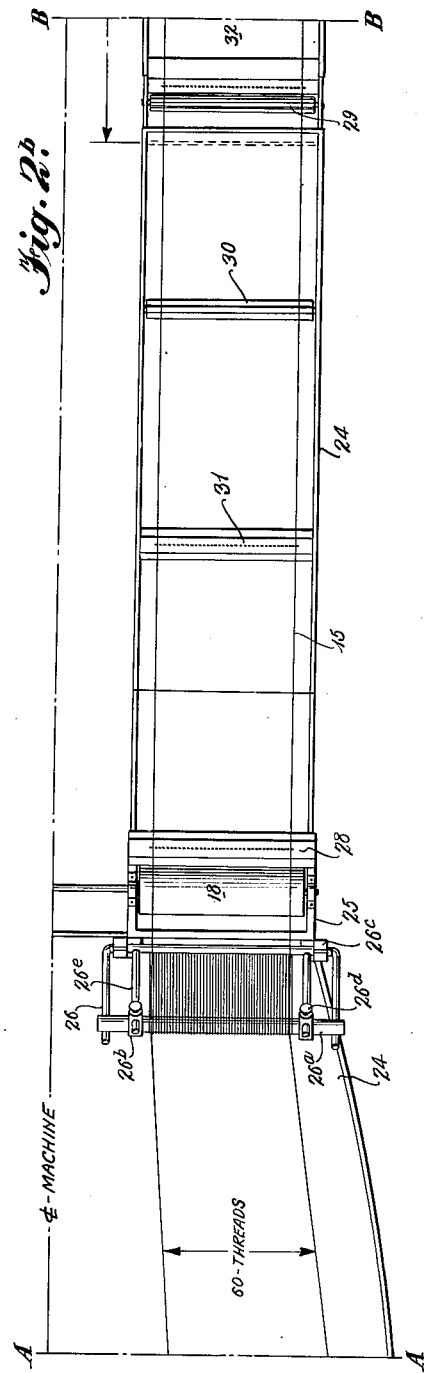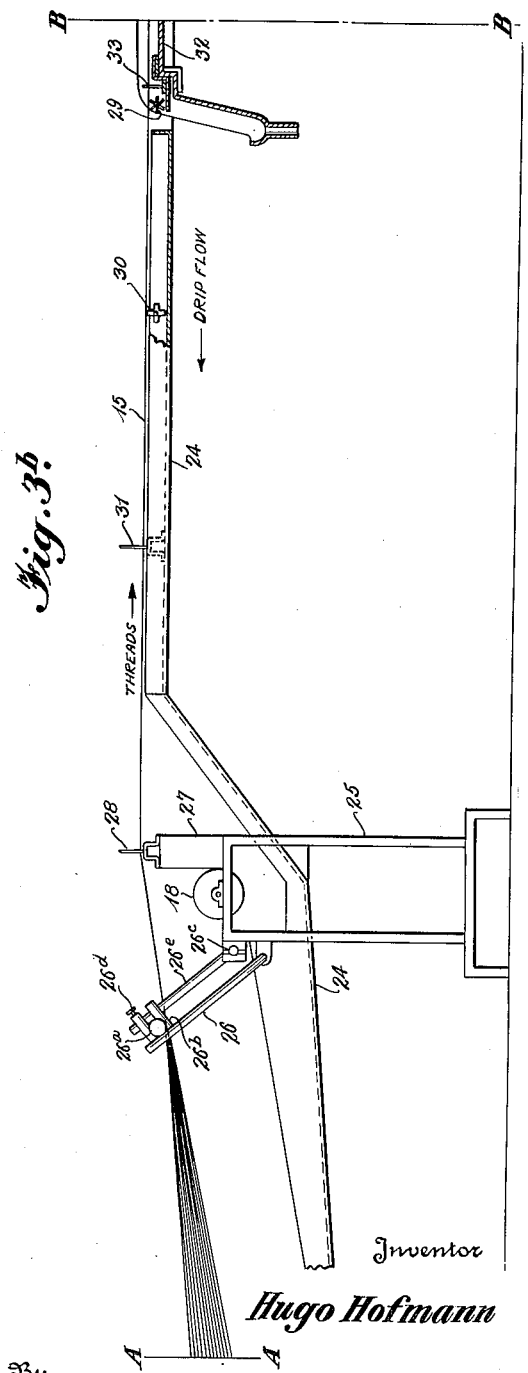

March 4, 1952

H. HOFMANN

2,587,619

PROCESS AND APPARATUS FOR THE PRODUCTION OF
SYNTHETIC THREAD

Filed Feb. 12, 1947

Inventor
*Hugo Hofmann*

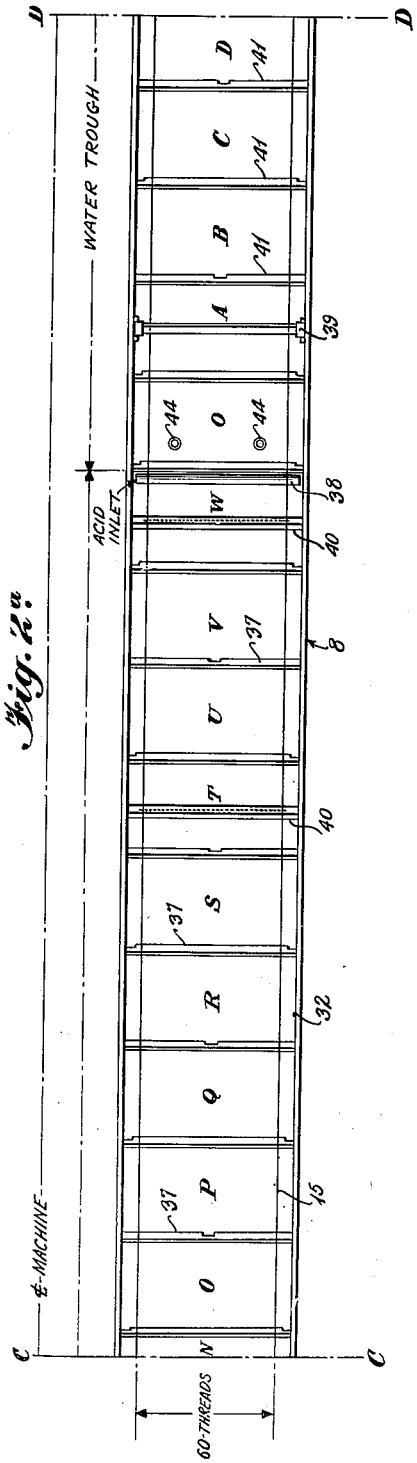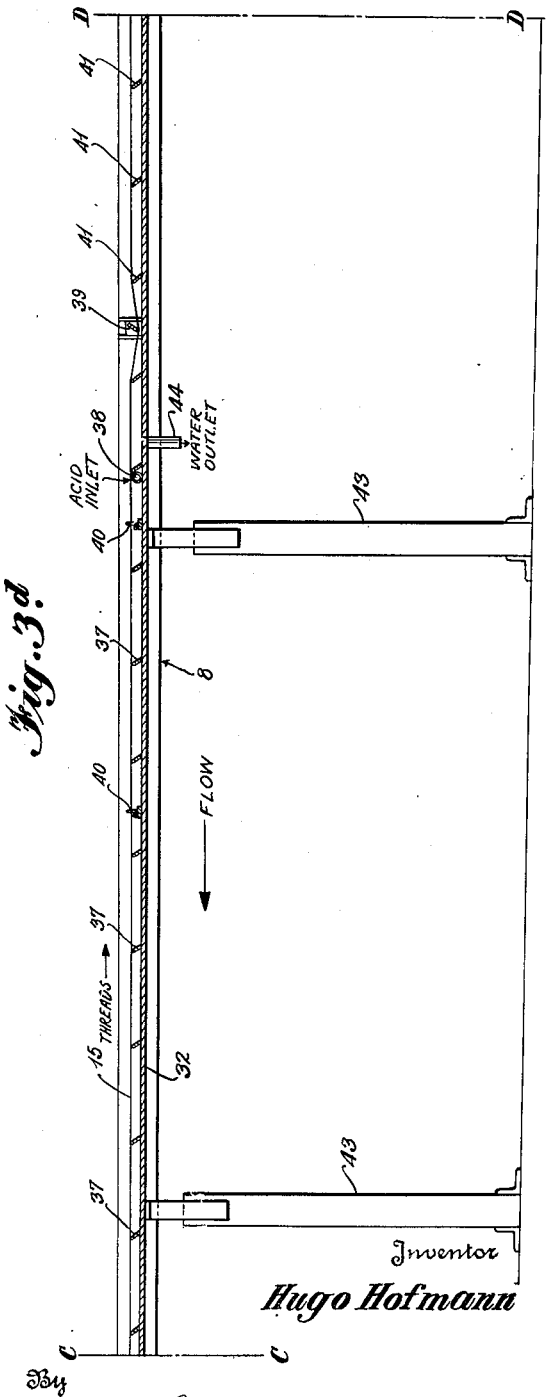

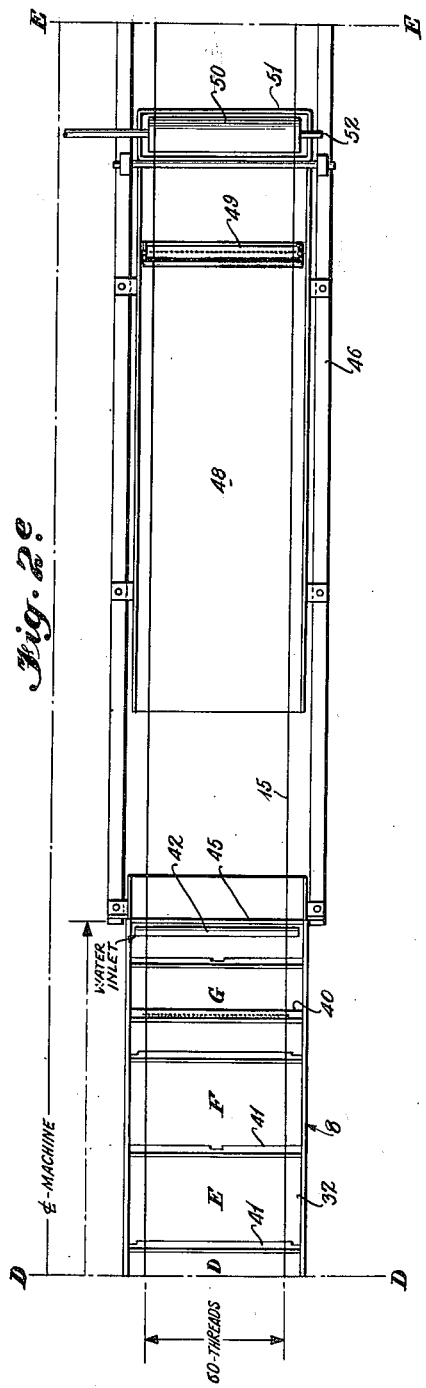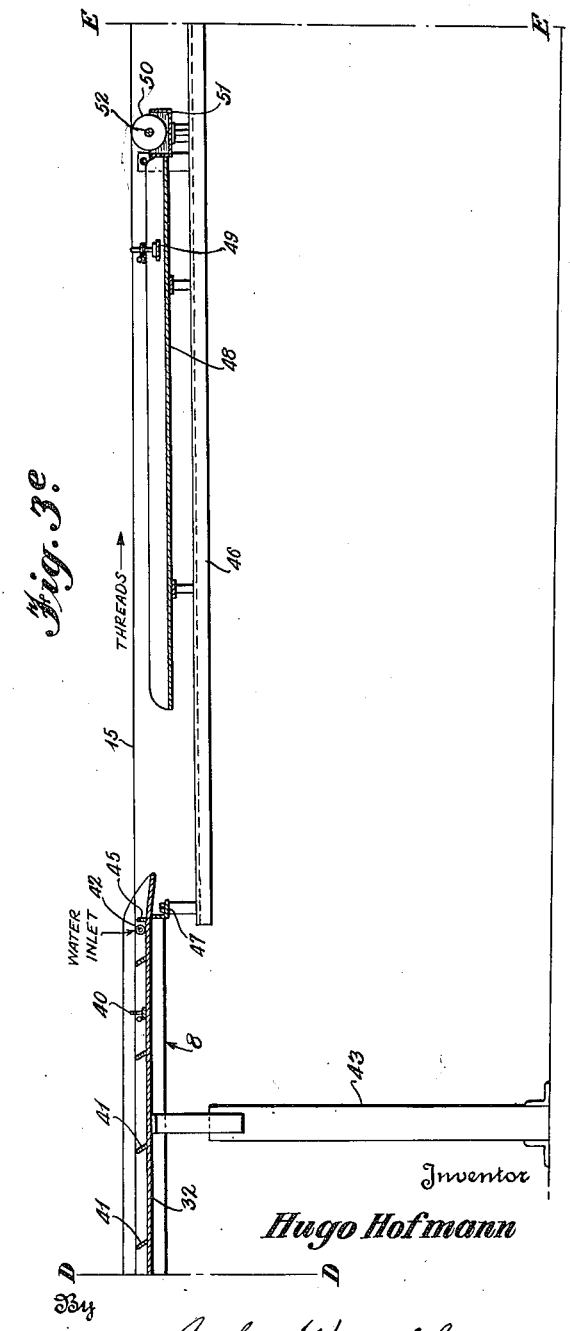

March 4, 1952 — H. HOFMANN — 2,587,619
PROCESS AND APPARATUS FOR THE PRODUCTION OF SYNTHETIC THREAD
Filed Feb. 12, 1947 — 11 Sheets-Sheet 7

Inventor
Hugo Hofmann
By Arthur Worischek
Attorney

March 4, 1952 H. HOFMANN 2,587,619
PROCESS AND APPARATUS FOR THE PRODUCTION OF
SYNTHETIC THREAD
Filed Feb. 12, 1947 11 Sheets-Sheet 8
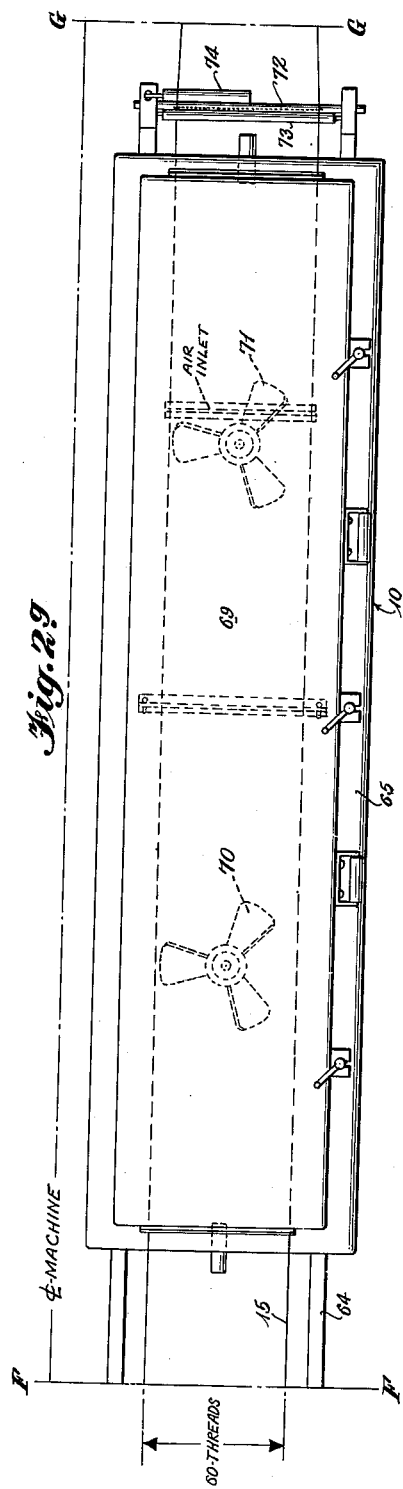
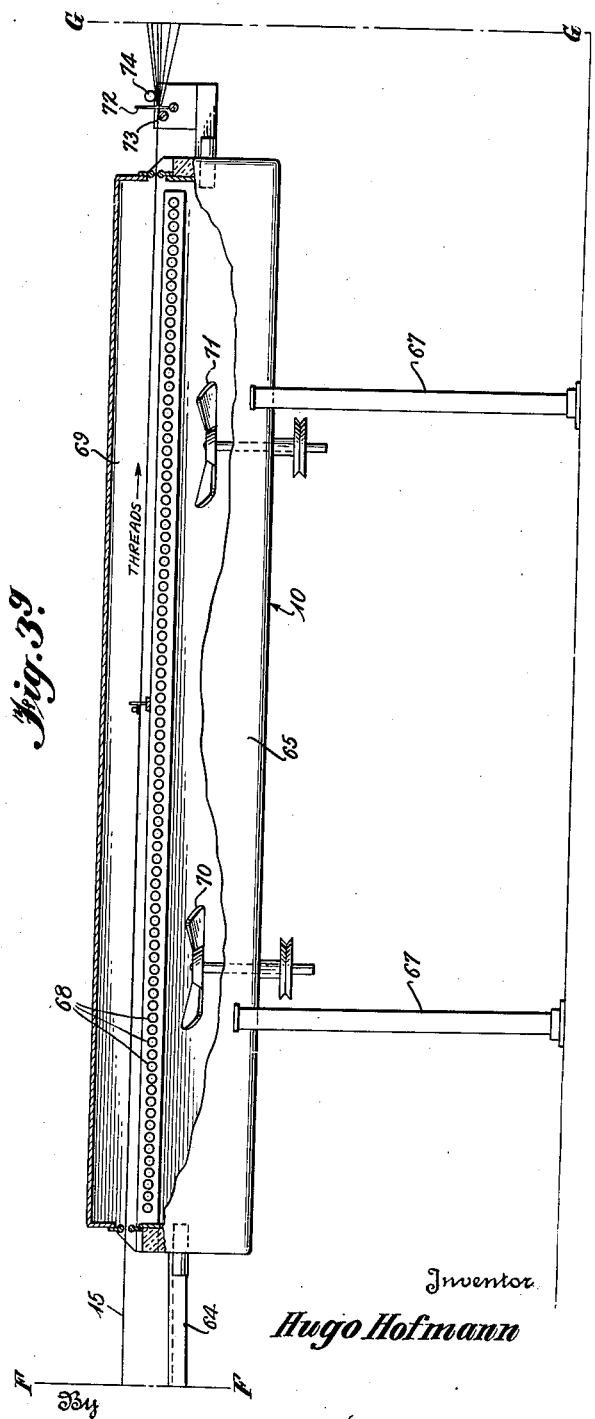
Inventor
Hugo Hofmann
By Arthur Woratzek
Attorney

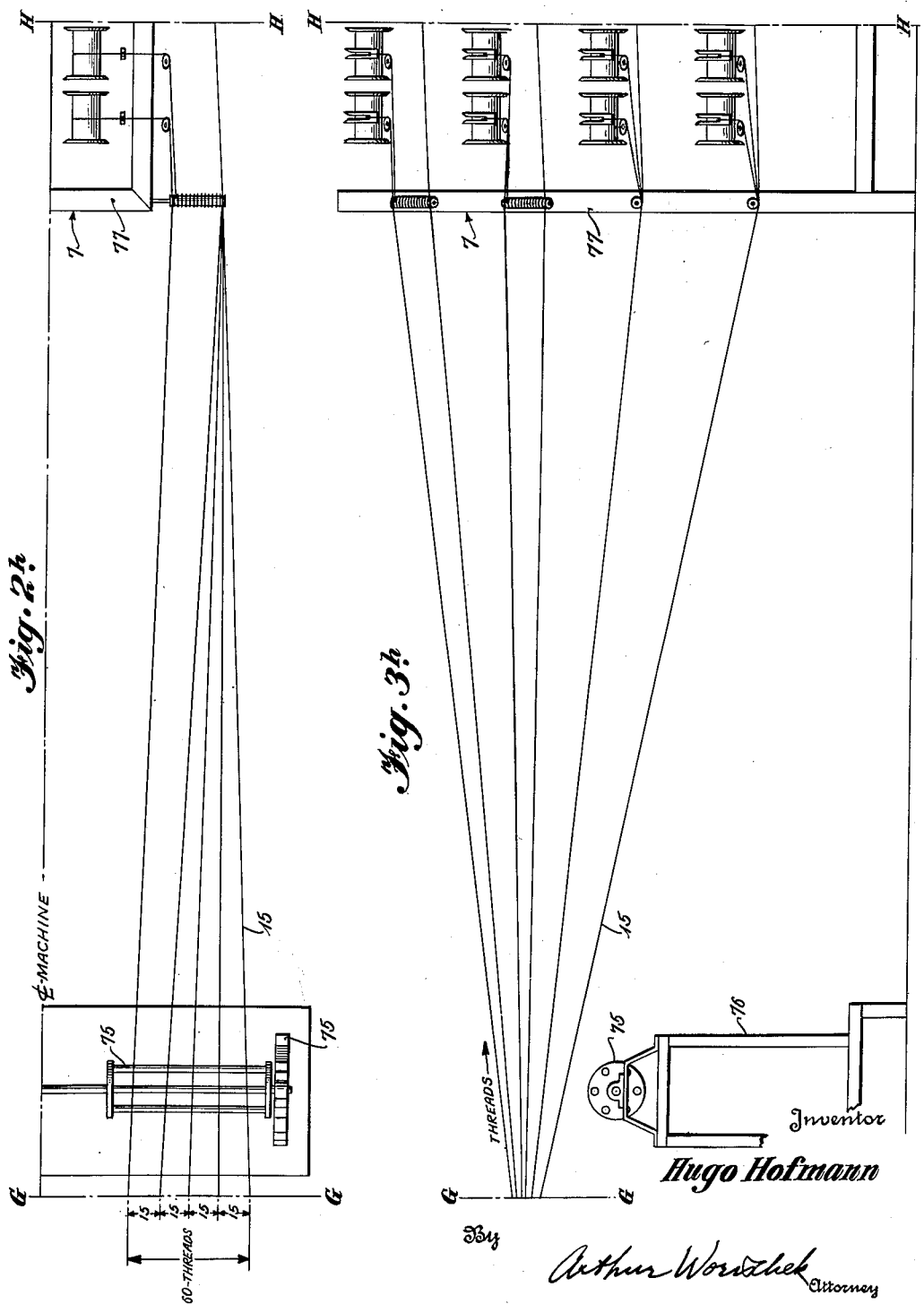

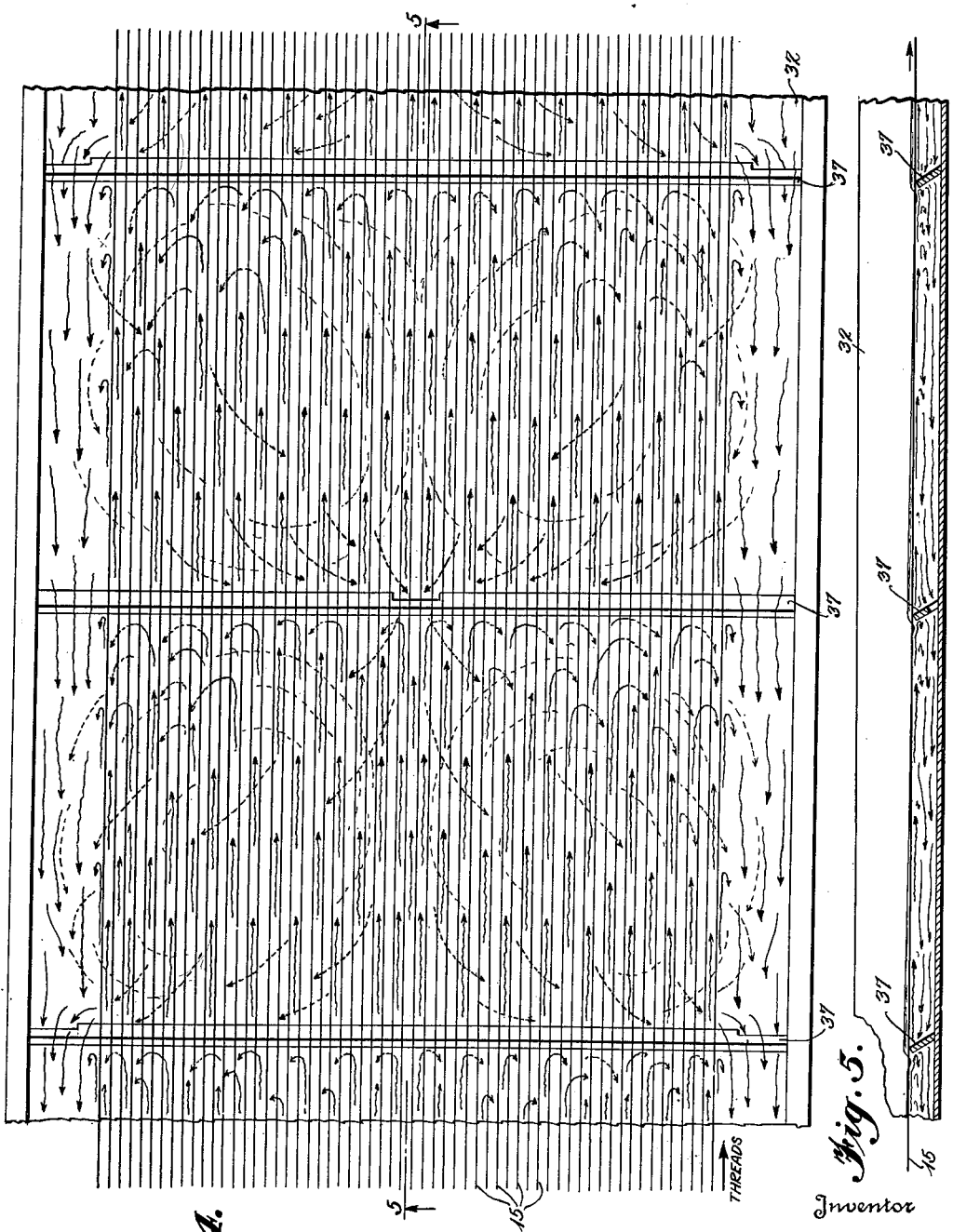

Inventor
Hugo Hofmann
By Arthur Woritzhek, Attorney

Patented Mar. 4, 1952

2,587,619

UNITED STATES PATENT OFFICE 2,587,619

PROCESS AND APPARATUS FOR THE PRODUCTION OF SYNTHETIC THREAD

Hugo Hofmann, Elizabethton, Tenn., assignor, by mesne assignments, to Beaunit Mills, Inc., New York, N. Y., a corporation of New York Application February 12, 1947, Serial No. 727,956

13 Claims. (Cl. 18—8)

1

This invention relates to the liquid treatment of thread, such as mono- or multi-filaments, twisted or untwisted, during linear movement thereof and more particularly to a continuous method of and apparatus for the production of synthetic thread in which freshly formed plastic filaments are treated during their linear movement to a collecting mechanism.

At the present time synthetic thread constitutes an important part of the total output of the textile industry and rayon thread formed by the viscose method and by the cuprammonium method, both of which methods involve formation and after-treatments of the thread in liquid baths, constitutes the major proportion of the total production of synthetic materials.

From the inception of the synthetic thread development it was recognized that to produce such thread in a continuous manner would afford certain advantages such as the elimination of the use of temporary collecting devices, the avoidance of numerous rewinding steps, and a reduction in the number of personnel required to operate the equipment. Notwithstanding this general conception in the industry, many difficulties were encountered when efforts were made to utilize continuous methods for the manufacture of synthetic threads, particularly in those processes which involve liquid treatments. In the relatively early attempts to develop continuous spinning methods it was found possible to produce threads by certain roller systems but the operations were unsatisfactory in that they were commercially unfeasible due to frequent breakage of the thread or filaments and difficulties encountered in threading up the equipment. Attempts were also made to propel the freshly formed threads linearly through a series of treating tanks as by passing the same around offset rollers submerged within the tanks but the difficulties involved in threading up rollers, so positioned, necessitated by frequent breakage of the thread, rendered the use of such equipment impracticable in plant scale operations.

Due to the difficulties encountered in the attempts to practice continuous methods of manufacturing synthetic thread by the wet treatment processes, the so-called discontinuous processes became the standard in the art. These processes involve the extrusion of the spinning solution from spinnerets or funnels to form filament bundles, the regeneration of the threads thus formed and the collection of the same in package form upon spools, skeins or in centrifugal pots. The packages thus formed are later subjected to various "after-treatments," including decopperizing

2 in the case of cuprammonium threads and desulphurizing in the case of viscose threads. Following the "after-treatments" the thread in the treated packages is rewound one or more times depending upon the ultimate use to which the thread is to be put. Thus, notwithstanding the fact that a continuous method of manufacturing rayon was initially recognized as the ultimate to be desired because of the uniformity of treatment to which the thread would be subjected and because of the reduction in the amount of handling thereof, the enormous amount of rayon now produced by the viscose process and by the cuprammonium process is made largely by the so-called discontinuous process. While, as indicated, the rayon industry has always sought a simple and practical continuous spinning process, during recent years some of the rayon thread produced in this country has been made by a continuous process involving the use of a system which is of itself very complex and expensive.

It is obvious that the simplest continous method of manufacturing rayon would involve merely the formation of the thread from a spinning solution and the passage of the thus formed thread in a substantially straight line to a collecting mechanism while subjecting it to "after-treatments" during the straight line passage. Attempts were made during the infancy of the art to produce synthetic thread in this simple manner. However, the suggested systems were not satisfactory for, among other reasons, they would not afford satisfactory after-treatment of the thread. Thus, attempts to "after-treat" which involved liquid treatment throughout an extended path of travel were thwarted because the distance of travel required for after-treatment was so great as to cause production problems outweighing the advantages inherent in the system. The space required for such equipment and the fact that the plastic thread is not sufficiently strong to withstand the pull or drag required to permit the propulsion thereof to a remote point of collection are among the problems involved. Attempts to propel the thread at spaced intervals throughout the extended path of travel by the use of rollers introduced further problems without affording a solution to those which were previously present.

It is an object of the present invention to overcome the difficulties heretofore encountered in the production of rayon and the like and to provide a method and apparatus for the efficient continuous production of synthetic threads. The invention involves the effective after-treatment of the threads as they are passed linearly for a relatively short distance, whereby the plastic threads may be drawn solely from the point of collection. To this end the invention contemplates the provision of a shallow liquid treating trough formed into a plurality of sections by means of which the thread undergoing treatment is caused to pass within the liquid in the several sections adjacent to the liquid surface, the liquid in each section being so maintained and its motion so correlated with respect to the movement of the thread that small, and in no event, prohibitory, amounts of liquid from one section are carried over into the liquid in the adjacent section in the direction of travel of the thread whereby chemical concentrations within the several sections are maintained distinctly different.

A specific embodiment of the invention is directed to the continuous production of rayon by the cuprammonium process wherein the spinning solution is passed through funnels in the usual manner and a plurality of the threads as thus formed are moved in their passage to a point of collection linearly and substantially longitudinally, in parallel relation to each other, through a series of interconnected treating bath bodies adjacent the upper surfaces thereof, the separate bath bodies being maintained characteristically different.

Another embodiment of the invention is directed to the continuous production of rayon by the viscose process wherein the spinning solution is extruded from a plurality of spinnerets into a coagulating bath in the usual manner and a plurality of the threads thus formed are "after-treated," the threads during "after-treatment," being passed in parallel relation relative to each other through a series of liquid bodies adjacent the upper surface of each, after which they are collected wet or in a dry substantially out-shrunk condition.

Other embodiments of the invention relate to the wet spinning or to the liquid treatment of threads or filaments formed from cellulose esters, such as cellulose acetate, from cellulose ethers, such as benzyl cellulose, or from protein, such as casein or zein, or from compositions or mixtures of materials of this general type.

One specific feature contemplated for use with various embodiments of this invention involves the passage under uniform tension of a plurality of parallel threads through the upper portions of a series of interconnected liquid bodies, the liquid flowing under retarding control through the series of bodies generally countercurrent to the movement of the threads. As an incident to this feature the tension upon the threads is controlled by the relative speed of extrusion and the speed of collection which follows the passage of the threads through the liquid bodies, and the threads running substantially horizontally between the extrusion station and the place of collection are not supported other than by the tension thereon, the buoyant effect of the liquid bodies, and by films of liquid overlying marginal edges utilized to define the respective liquid bodies.

To practice most efficiently the general process involving the passage of the plurality of parallel threads through the interconnected bodies of liquid use is made of a shallow trough slightly tilted to effect flow of the liquid counter-current to the threads. The trough is separated into relatively short sections by dams having openings adjacent their respective lower edges, which openings in alternate dams are staggered to cause circuitous flow of the liquid along the trough bottom. The denier, speed of travel and number of the threads, as well as the number and character of the dams, the feed of the liquid to the trough and the tilt of the trough are factors which are so correlated as to cause the liquid to flow to each lower trough through the openings in the respective dams and across the top edges of the dams beyond the grouped threads. Due to such action intensive, substantially local, liquid circuits or currents are maintained within the respective liquid bodies contributing to the substantially uniform treatment of the threads and the flushing of sediment along and from the trough. Additionally the correlation of the factors set forth creates and maintains a wall of liquid extending along the upper edge of each of the dams in the path of the threads so that the threads as they are drawn from the lower bodies of the liquid into adjacent upper bodies are caused to penetrate the respective liquid walls without the carry-over of a prohibitive amount of liquid into the body beyond the particular wall surface.

This invention contemplates the provision of apparatus in which a large number of threads are initially formed and partially or completely finished continuously and simultaneously, the threads being constantly visible and accessible from the point of initiation to the point of collection to permit inspection and discontinuance in the production of one or more threads as desired or necessary. Apparatus constructed in accordance with this invention permits the convenient and rapid stringing up of a large number of threads simultaneously at the inception of a period of operation as well as the selective stringing up of individual threads or groups without interfering with other threads being produced. Apparatus contemplated by this invention may be constructed as a straight line prolongation of the extrusion station to permit a straight line relation positioning of a relatively large number of spinning units. Such prolongation of the apparatus permits the passage of the resulting large number of threads in parallel relation directly into the treating trough and thence to the collecting mechanism whereby the tension exerted upon the individual threads is effected from a point beyond the treating trough and a uniform tension is maintained on all the threads.

Other objects and advantages will be apparent from the following detailed description when considered in connection with the accompanying drawings.

While the principles involved in the treatment of threads such as those produced in the cuprammonium and viscose methods are understood, the theory underlying the effectiveness of the short distance of travel required for after-treatment of the threads within the trough of this invention is not entirely understood. However it has been noted that the individual filaments of the threads as the threads are passed in the manner aforesaid are so spread out or separated that the treating liquids have free access to the individual filaments. Due to the fact that the theory is not entirely understood, the accompanying drawings have been prepared on a scale basis from equipment in actual use so that such equipment can be duplicated in all critical aspects if desired. On the other hand, the constructional and functional characteristics with which this invention is concerned are so set forth as to fully apprise one of the essential features of the invention even in their more specific aspects. Thus, even without reference to specific dimensional data, one skilled in the art is able so to correlate the variable factors involved as to produce various desirable physical effects hereinafter more fully discussed.

In the drawings:

Figure 1 is a general plan view of one form of system constructed in accordance with the present invention for producing rayon in a continuous cuprammonium process.

Figure 2e discloses a continuation of the trough illustrated in 2d and a preparation mechanism beyond the trough.

Figure 2F:
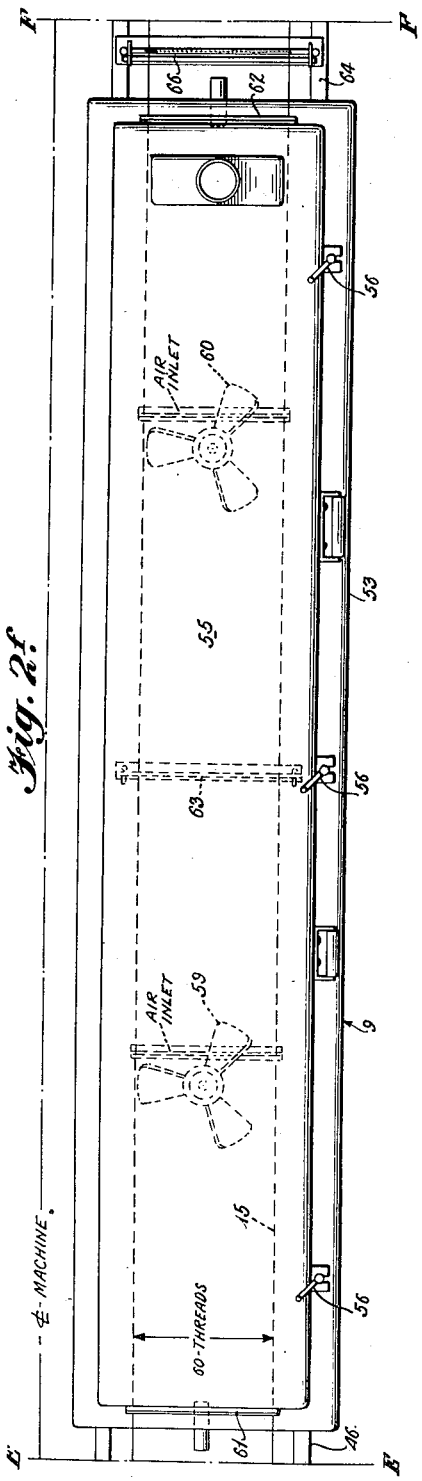
Figure 2a is a top plan view of the lower half of the spinning station as illustrated in Figure 1.
Figure 2b is a plan view of a drip trough immediately following the spinning station in the line of travel of the threads, the view illustrating also the entrance portion of the treating trough constituting a principal part of the present system.
Figure 2c is a plan view of a continuation of the treating trough the end of which is illustrated at the extreme right of Figure 2b.
Figure 2d is a continuation of the trough shown in 2c, the trough as illustrated through the legend designated "acid inlet" comprising the acid treatment trough while that portion of the trough beyond the acid treatment trough forms a part of a water treatment trough.
Figure 3F:
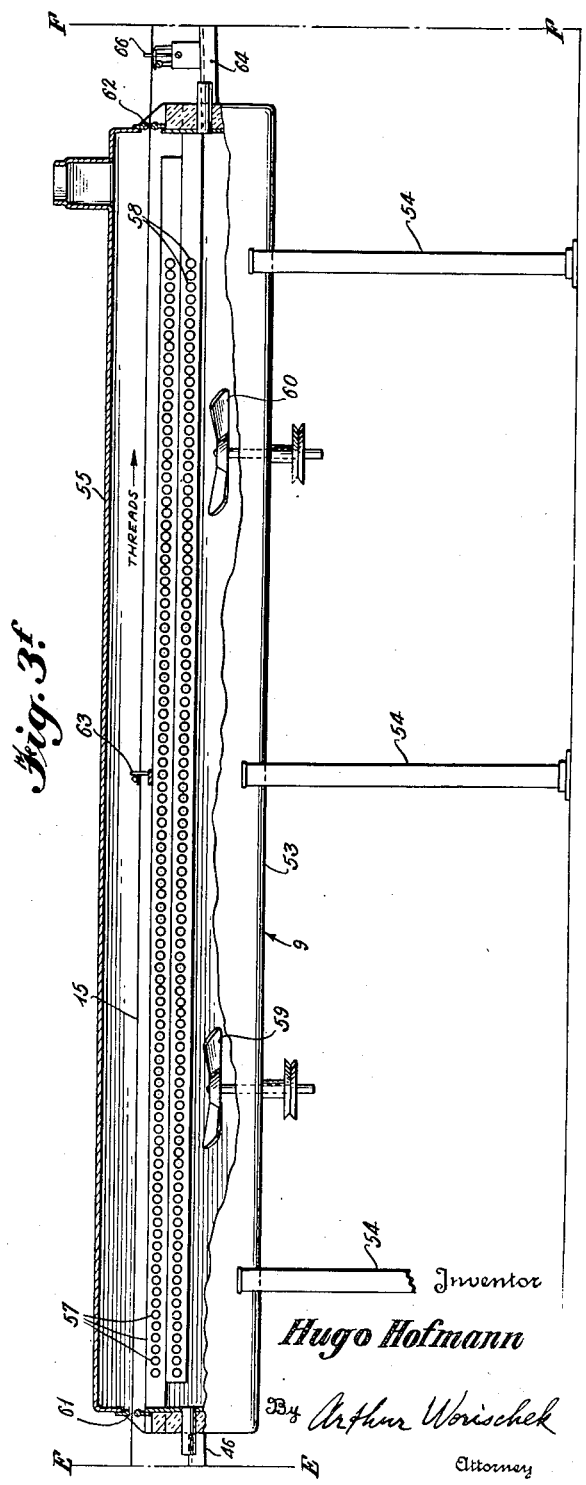

Figure 2f is a plan view of an initial drier.

Figure 2g is a plan of another drier.

Figure 2h illustrates the manner of passage of the treated thread to collecting mechanism which may be of any normal construction, only a part of the collecting mechanism being illustrated diagrammatically.

Figures 3a–3h are side elevations of the apparatus illustrated in Figures 2a–2h, respectively.

Figure 4 is an enlarged plan view of a section of the treating trough shown in Figure 2c, the figure illustrating the generally circuitous paths taken by the treating liquids as has been observed during operation of the apparatus.

Figure 5 is a sectional view taken on line 5—5 of Figure 4 likewise illustrating the localized currents of the treating liquid as observed during operation of the apparatus.

Figure 6:
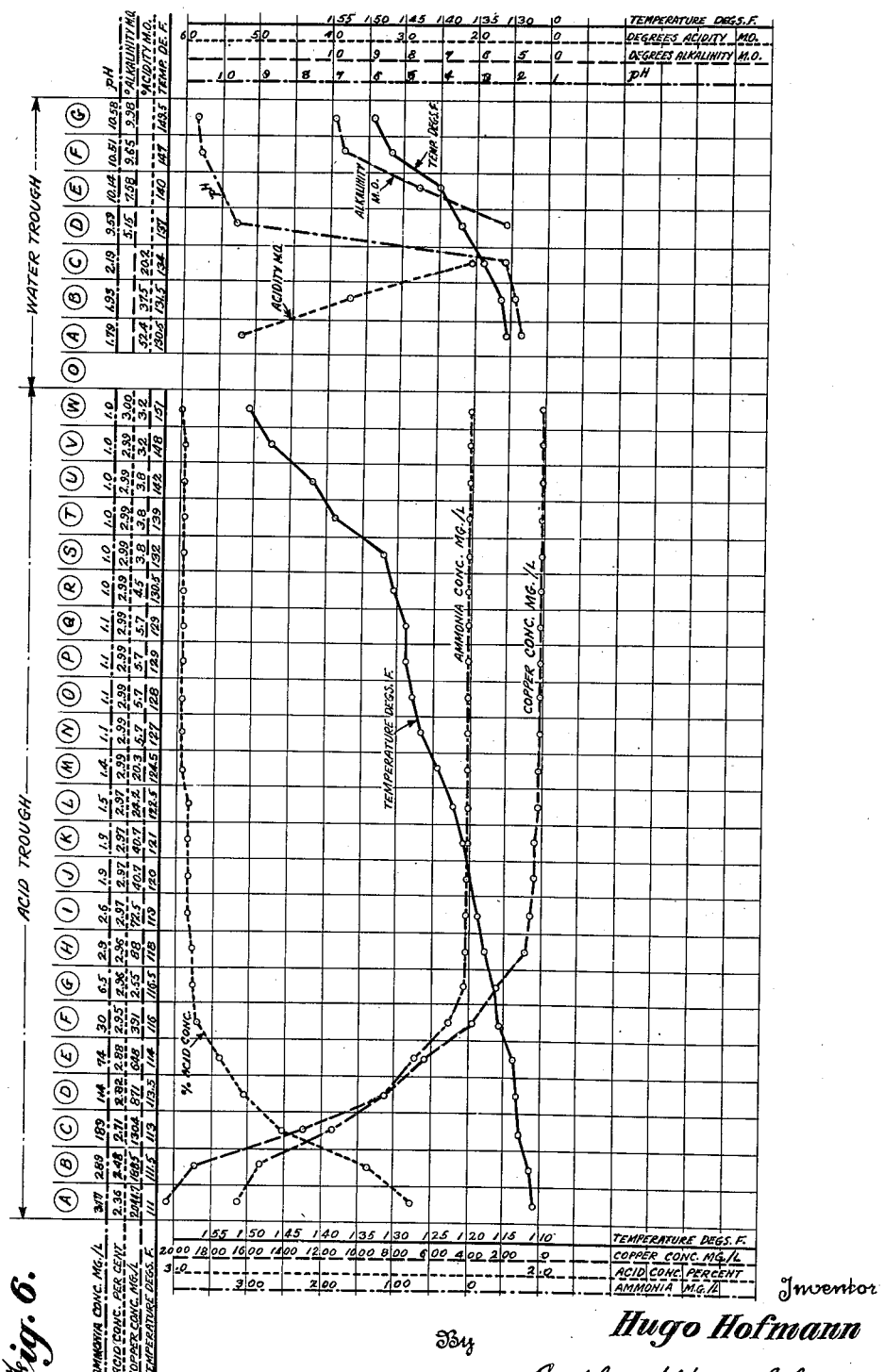

Figure 6 is a graph prepared on the basis of a specific operation hereinafter referred to, setting forth chemical and temperature characteristics of the liquid bodies existing in each of the sections throughout the treating trough illustrated in Figures 2b and 3b through Figures 2e and 3e, respectively, the sections being lettered consecutively in the direction of travel of the threads.

Figure 7 is a perspective view of a temporary separator used in the stringing up of the machine in said operation.

Figure 8 shows the separator set forth in Figure 3 positioned for use in stringing up the machine illustrated for the continuous production of rayon by the cuprammonium process.

Before referring to the drawings in detail a brief reference will be made to the cuprammonium spinning process for the production of rayon in order that the utilization of the equipment disclosed may be readily understood.

In the so-called cuprammonium process for the production of rayon the spinning solution is extruded through orifices in a spinneret and into a spinning liquid passing through a funnel-shaped vessel normally designated as a funnel. The solution so extruded is coagulated in the form of a plurality of fine filaments. A stretching of the filaments is effected and, as they are passed with the liquid from the lower end of the funnel, the filaments, now in bundle form, are passed around a rod or roller. The bundle is then passed through a bath and coagulation of the thread is completed. This general process for forming thread and the equipment used therein are well known in the art and are disclosed in the following United States patents which are set forth by way of examples: Nos. 1,549,364; 1,596,086; 1,646,788; 1,676,334; 1,682,797; 1,867,297; 1,828,497; 1,867,298; 1,871,704; 1,947,159; 1,997,930; 2,022,961; 2,027,911; 2,030,985; 2,046,576; 2,062,714; 2,065,175; 2,095,220; 2,196,630; 2,289,657 and British Patents Nos. 337,608 and 365,502, etc.

The threads as thus formed still contain copper and other compounds and they are passed to suitable collecting devices such as reels as shown for example in United States Patent No. 2,062,714. The thread in the packaged form is subjected to various baths for treating, washing or conditioning the thread, after which the thread is rewound onto cones or the like. The initial operation leading up to the actual collection of the thread on the reels and the like is generally termed "stringing up."

Normally the thread is subjected to dilute sulphuric acid during its passage to the reel. The dilute sulphuric acid is utilized to remove the copper compounds from the thread. The thread as thus treated is thereafter washed for the purpose of removing residual acid. The thread as collected is subjected to a succession of liquid and conditioning treatments either in the form of packages or as unsupported skeins. After the liquid treatment operation the threads in package form are dried, and this operation is followed by a rewinding onto spools or cones. Depending on the use to which the thread is to be put additional treatments may be made such as twisting, oiling, sizing, and the like.

In producing rayon by the cuprammonium process in accordance with the present invention, the spinning solution is extruded and the yarn or thread is subjected to the normal treatments as set forth above with the exception that the process is so conducted that the threads are treated as they are moved continuously through the apparatus.

In referring specifically to the drawings and particularly to Figure 1 a complete machine for the practicing of a continuous cuprammonium process for the production of rayon is illustrated. The spinning station is illustrated schematically at 1. The spinning station is formed with two banks of funnels 2 and 3, respectively, the threads formed by the funnels of bank 2 being passed in spaced parallel relation continuously through the treating trough assemblies designated generally at 4 and thence through driers 5 and 6, respectively, to collecting bobbins mounted for operation in the corresponding side of winding unit 7. The threads formed in the funnels of the bank 3 are passed through a trough 8 corresponding to trough 4 in the same manner as they are passed through trough 4, said threads then being passed through driers 9 and 10 corresponding to driers 5 and 6, after which the threads are collected on appropriate bobbins mounted in the collecting mechanism 7.

For simplification of illustration only one side of the apparatus shown in Figure 1 is illustrated in detail. The cuprammonium spinning solution is extruded through spinnerets (not illustrated)

contained within each of the funnels 11 of the bank 3 by means of a pump operated in the usual manner. In the machine illustrated sixty funnels 11 are utilized in each bank and they are vertically mounted in straight line rows.

A common header 12 is utilized to supply cuprammonium solution of suitable type to each individual spin funnel through connections 13. In the process specifically utilized when practiced with the apparatus herein described, the cuprammonium spinning solution is forced through the header and is extruded through a spinneret arranged within each of the funnels 11. Warm water, of a soft character, is supplied to the funnels in the normal manner, the water being at a temperature of approximately 30° C. The extruded solution is formed into filaments in the presence of the water and the resulting bundles of filaments and water then issue from the lower ends of the funnels. The supports 14 for the funnels are preferably formed of glass in the equipment utilized. The filaments issuing from the lower ends of the funnels are partially coagulated and partially stretched. In the drawings the filaments or threads are designated by reference numeral 15.

At the beginning of a spinning operation the bundles of filaments 15 are permitted to accumulate in drain trough 16. Later, however, each group of filaments constituting an individual thread is passed under a rod 17 and through one of the spaces defined by adjacent teeth 19 of the combs 20, a temporary collecting device 18 being used in initiating the operation by a procedure to be hereinafter fully described. The combs 20 are adjustably positioned and act as guides to maintain the individual freshly formed threads in spaced relation. Waste water from the funnels falls into drain trough 16 and flows through hopper-like apron 21 from which it passes into drain 22. Rods 17 serve as guides for the individual threads. Combs 20 have their bars 23 adjusted angularly to cause the threads to radiate out at suitable angles to spread all the threads from the spinning portion of the machine into a formation adapted to cause them to pass in straight line relation into the treating portion of the machine.

Beyond the apron 21 a drain trough 24 is provided, see Figures 2b and 3b. Drain trough 24 lies under temporary collecting roller 18 and connects with apron 21. A standard 25 is positioned partially to support the trough 24 and this standard is also provided with bearings for the shaft of the driven temporary take up roller 18. In addition to supporting the bearings for driven take up roller 18, standard 25 carries a guide 26. A bracket 27 holding a comb 28 is mounted on standard 25. The guide 26 is for aligning the threads for entry into the comb 28. The teeth of comb 28 extend upwardly and are spaced a distance equal to the spacing of teeth 19 of combs 20. The guide 26 consists of a transverse bar 26a which may be made of glass or the like and which is mounted in bearings 26b supported on arms that are pivotally mounted at 26c. The bar 26a is removable from the bearing by loosening set screws 26d and the entire assembly is horizontally positioned by a yoke 26e which has arms functioning as stops to limit the counter-clockwise movement of the bar 26a as used in Figure 3b.

The thread path at the base of the teeth of the comb 28 lies in a plane slightly below the plane of the edge of the uppermost blade of a support 29. The support is provided with a series of radially disposed blades and is adapted to be rotated manually to present a new blade as a particular blade used to support the threads 15 during their passage through the apparatus becomes coated. Thus a new blade may be presented when needed without interruption of the process. Another support 30, which may be rotated in the same manner as support 29, is mounted within the trough 24 for engaging the threads 15 in their normal passage thereover and a comb 31 having its teeth positioned in a direct line between comb 28 and support 29 is arranged intermediate comb 28 and support 30.

Support 29 is mounted at one end of trough 32 which is illustrated in Figures 2b and 3b, the remainder of the trough 32 being illustrated in Figures 2c and 3c. It has been found that the trough as herein illustrated is particularly suitable for use in the continuous production of rayon by the cuprammonium process since the treatment of a plurality of such threads in the trough is effective to remove the copper and ammonia and otherwise to condition the threads being passed linearly therethrough to an extent not heretofore deemed possible in such a short distance of travel. The theory underlying this effective treatment of the plurality of newly formed threads is not fully understood but, as will be set forth with specific reference to a detailed process carried out with this equipment, amazing results have been obtained.

The lower end of trough 32 adjacent support 29 is provided with a comb 33 the teeth of which are adapted to maintain threads passing over the upper edge of support 29 in spaced relation. Guiding bars 34 and 35, respectively, are provided adjacent comb 33 in the lower end of the trough to cause the threads to engage closely a film of liquid on the upper surface of a lower flat elongated dam 36. The bars or depressors 34 and 35 are comprised of a bar member which extends transversely of the thread path and which is provided at its ends with blocks mounted for free vertical sliding movement in channels located at the sides of the trough. A series of dams 37 are provided, the dams being preferably tilted toward the point of entrance of the threads to the trough. Dams 37 are equally spaced and are provided throughout the length of the trough extending into that portion illustrated in Figures 2d and 3d to the point of the inlet for dilute acid indicated at 38. Spaced at intervals along the trough are depressors 39 similar to the depressor or bar 35 and combs 40 are arranged at spaced points along the trough for maintaining the plastic threads separate. Care must be taken to avoid contact between the threads as such contact results in adherence between the threads involved and such adherence may cause the carriage of liquid over the dams throughout the length of the trough, or even thread breakage.

In the form illustrated the trough is continued as a unit beyond acid inlet 38 and the portion of the trough as thus extended through the left hand portions of Figures 2e and 3e, respectively, constitutes a water treatment trough. Dams 41 similar to dams 37 are spaced equally throughout the length of this extension of trough 32 and an inlet 42 is provided for the admission of warm water adjacent the extreme upper end of the trough. The trough 32 is maintained at the desired inclination by means of supports 43. Outlets 44 are arranged in the trough section just beyond the trough section containing acid inlet 38, whereby the treating water is wasted and prevented from intermixing with the acid bath in the acid treating portion of the trough.

At the extreme upper end of trough 32 a vertical dam or baffle 45 is provided to prevent the flow of the water from the upper end of the trough. A frame 46 is attached to the upper end of this trough through the medium of the bolt and bracket indicated at 47 and a drip catch plate 48 is supported upon the frame in the direction of extension of trough 32 and underlying the normal path of travel of the threads from the trough. A comb 49 for maintaining the threads separated is mounted adjacent the upper end of drain plate 48 and a preparation applicator roller 50 is mounted in transverse trough 51 upon a driven shaft 52. Roller 50 is elevated to a position where its upper surface is in the same horizontal plane as the upper edge of dam 45. The end of frame 46 remote from the connection at 47 is secured to the frame 53 of drier 9. Drier frame 53 is retained in proper elevation by means of supports 54. The drier is of rectangular construction in plan and is provided with a cover 55. Cover 55 is pivotally mounted to permit it to swing open whereby access may be had to the interior particularly to facilitate the stringing up of the apparatus. Latches 56 are provided for securing the cover in closed, operative position. A heating unit formed of two rows of heating tubes 57 and 58 are arranged in the body of the drier, steam being delivered to the tubes through connections (not shown) for the purpose of maintaining the tubes at a desired uniform temperature.

Fans 59 and 60 are provided to circulate air within the drier, the fans being driven from suitable sources (not shown) and being adapted to be driven at different speeds as desired. Horizontally arranged pairs of bars 61 and 62 are carried respectively by the cover and body portion of the drier to define the entrance and exit of the thread passage through the drier. The threads in passing through the drier are under the same tension as the threads in passage over roller 50. A comb 63 is arranged to maintain the threads separated in their passage through the drier. Bar 64 is mounted upon drier frame 53 and its opposite end is secured in frame 65 of drier 10 illustrated in Figures 2g and 3g. A comb 66 is mounted on bar 64 for maintaining the threads separated in their passage to drier 10. Drier 10 is of a construction generally similar to that of drier 9 and is supported in horizontal alignment with drier 9 by means of standards 67. In the form of apparatus illustrated in Figures 2a–2g, inclusive, and 3a–3g, inclusive, two driers are utilized for convenience in the handling of the equipment. Drier 10, as shown, is formed with one series of heating tubes 68 through which steam is passed from a source (not shown). The cover is shown at 69 and fans at 70 and 71, the latter being adapted to be driven from a source (not shown). As indicated, drier 10 is generally similar to drier 9 and an intermediate comb is mounted therein.

A comb 72 is secured adjacent the egress end of the drier 10 and horizontal guides 73 and 74 are arranged to keep the threads in position between the teeth of the comb. A temporary storage device 75 mounted on standard 76 and driven from a suitable source (not shown) is illustrated in Figures 2h and 3h. The temporary storing device is only utilized during the stringing up of the apparatus. While a particular form of collecting device 77 is schematically illustrated, any suitable form of collecting device may be used. In the preferred operation it is only necessary that the collecting device be such as to apply uniform tension to the threads undergoing treatment. The packaging unit 7 illustrated comprises two sections placed back-to-back, each provided with four horizontal shafts arranged to carry 15 spools, partially shown, so that the entire packaging unit will accommodate 120 individual spools representing 60 threads produced simultaneously within each section of the apparatus. The packaging units may be placed in straight-line prolongation relation to each thread producing portion to provide a point of collection for each thread produced by the machine. As indicated, however, any packaging unit capable of effecting the desired pull on each of the threads being produced may be utilized.

The portable separator 78 shown in Figures 7 and 8 is formed of a frame member 79 which carries upright pins 80, the spaces between the pins corresponding in number and width to the teeth and spaces in the combs utilized for maintaining the threads 15 separate during the operation of the machine. A cover bar 81 is preferably hinged at 82 to the frame member 79. Cover bar 81 is adapted to be latched to the frame member by means of a spring tongue 83 which is received in opening 84 in the free end of the cover bar to insure the proper retention of the parts in position during the stringing-up operation. This portable separator is not specifically claimed herein, the detailed device having been illustrated for the purpose of defining its use in a specific operation referred to immediately hereinbelow.

*Example of producing rayon by the cuprammonium process on the apparatus illustrated in Figures 1–3h, inclusive*

This specific operation performed in the apparatus as thus described involved the use of a spinning solution containing substantially 7.4% by weight of cellulose, substantially 5.6% by weight of ammonia and 3.4% by weight of copper.. This spinning solution was extruded into the banks of funnels 2 and 3 comprising 120 spinning positions. Of these the 60 funnels constituting the bank 3 are utilized for reference in this example. The solution was extruded through a spinneret in each funnel at 42 meters per minute to form a 60 filament thread bundle. The titre of each bundle was 75 denier. Substantially 300 cc. of water having a hardness of about 0.25° (4.5 parts of $CaCO_3$ per million parts of water [pH about 9.7]) at a temperature of substantially 31° C. was passed through each funnel per minute to initially coagulate and stretch the filaments. About 50 mg. of d-sorbitol containing other closely related polyhydric bodies, sold by the Atlas Powder Company of Wilmington, Delaware, under the trade name of "Arlex" was added to each liter of spinning water to reduce the precipitation of copper hydroxide in the funnels, funnel nipples and on the rods 17. At this point chemical analysis of the thread indicated the cellulose to copper to ammonia ratio to be: 1:0.253:0.082.

The bundles of filaments were permitted to run into trough 16 directly below the respective funnels while operators led the thread bundles onto temporary collecting roller 18. This was done by manually grasping several thread bundles at a time, guiding the individual thread bundles under the respective rods 17 and then wrapping the several bundles around the rotating temporary collecting roller 18. After all of the threads had been led in this fashion to the collecting roller 18, the individual threads issuing from adjacent funnels were directed into correspondingly adjacent spaces between the teeth 19 of the combs 20. The rotation of roller 18 was continued at a peripheral speed of 42 meters per minute until all of the threads had been passed around their respective rods 17 and through the respective teeth of the combs 20.

At this stage in the stringing up procedure an operator inserted the pins 79 of the portable separator 78 between the respective threads 15 passing between the temporary collecting device 18 and the preceding combs 20. The cover 81 of the portable separator was then closed and the threads were continued to be drawn through the spaces between the pins, by the roller 18. All of the threads were then severed simultaneously from the collecting roller 18 and one operator gripped all of the leading ends and led them to temporary collecting roller 75, see Figure 3h. While one operator was doing this, another operator walked along the machine as it is viewed in Figures 2b–2g and 3b–3g utilizing the portable separator to properly insert the threads between the teeth of the various combs, the guide 26 being dropped into position and the various depressors applied after the threads had been aligned in the several combs. Care should be had to retain the several threads in position within the combs as the operator proceeds with the stringing up. Upon reaching the temporary storage roller 75, the portable separator was opened and removed from the threads. During the leading of the threads to roller 75 they were passed over the body portions of driers 9 and 10, the respective drier tops 55 and 69 having been swung open for the stringing up operation. After proper positioning of the threads, covers 55 and 69 were closed.

Prior to the initiation of the thread passage within the trough 32, a dilute sulphuric acid solution of about 3.0% by weight of sulphuric acid was fed, at a temperature of 151° F. into the acid treating section of the trough through inlet pipe 38 at a rate of 2.5 liters per minute, see Figures 2d and 3d. Due to the inclination of the trough the dilute acid flowed downwardly toward support 29 and outwardly through the drain positioned therebelow. The magnitude of this inclination is determinable from measurements of the elevation of the plane of the threads passing over dams of equal height adjacent opposite ends of the trough 32. Thus the thread plane was at an elevation of 40.89" above the horizontal floor at the dam adjacent the support 29 and at an elevation of 44.48" thereabove at the dam adjacent the inlet 42 at the water bath and of the trough, see Figures 3b and 3e. The trough was 16" wide (internal dimension) and the dams were .5" high. Due to the inclination of the dam the upper edges thereof were .44" from the bottom of the trough. The distance between the innermost and outermost threads of the group running in the trough 32 was 12.91" adjacent threads being positioned .22" apart.

Water at a temperature of 149.5° F. and a pH of 10.58 was introduced into the trough 32 through pipe 42 at 2.5 liters per minute and as a result of the trough slope, flowed downwardly and counter-current to the thread travel, the waste water being discharged from the trough through outlets 44 shown in Figures 2d and 3d.

Continuing now with the stringing up of the machine, the threads being temporarily collected on roller 75 were individually separated from that roller and were led around guides to appropriate collecting bobbins mounted in the winding device 7. All of the bobbins were operated at a uniform speed with respect to each other and at a constant peripheral speed. The peripheral speed of the bobbin was 42 meters per minute. During the operation of this example the fans of drier 9 were operated so as to provide a moderate circulation of air over the heating tubes 57 and 58 and the threads. The drier was maintained at a temperature of 325° F. Fans 70 and 71 of drier 10 were similarly operated. The temperature of the second drier was maintained at 195° F.

On the preparation roller 50, a mixture of sulphonated oil and soap was used as a detergent and lubricant. Tinting with water soluble dyes may also be effected at this point.

After the process was completely underway the liquid bodies in the various sections of the trough 32 were analyzed and the temperature of each noted at the time of taking the sample. The graph of Figure 6 illustrates the results of the analysis of the liquid bodies both in the acid treating portion of the trough 32 and in the water treating portion of the trough. For ease of consideration the points as plotted with respect to the bath constituents and the temperature are alphabetically set forth at the top of the graph with the particular trough sections being designated consecutively and corresponding to the trough sections in Figures 2b–2e, inclusive.

It will be noted that in the first section A of the trough the copper concentration in mg. per liter was 2044.7. The copper concentration in the second section B dropped to 1885 and within the next seven sections (C to I, inclusive) the copper concentration dropped to 72.5 and from section I to section N the copper concentration dropped to 5.7, a slight drop in the copper concentration continuing to occur through to section W where the copper concentration was 3.2. The body of treating liquid in section A had an ammonia content of 317 mg. per liter whereas in the second section B it dropped to 289 mg. per liter with a sharp drop in ammonia concentration between section B and section H. As shown by the graph the ammonia concentration in section H was 2.9 mg. per liter whereas in section L the ammonia concentration had dropped to 1.5 mg. per liter. Throughout the remaining sections of the trough devoted to acid treatment, the ammonia concentration dropped only .5 mg. per liter the ammonia concentration in the twenty-third section W being 1.0 mg. per liter. The sulphuric acid in the various sections of the trough utilized for the acid treatment was highest in the twenty-third section W at the point of admission, the acid concentration in that section being 3.0%. The acid concentration remained substantially constant in its counter-current flow with respect to the threads until in section M where analysis indicated its concentration to be 2.99%.

Between sections M and F a gradual drop in acid concentration occurred as is indicated by the graph, the acid concentration in section F being 2.95%. Between sections F and A, however, a decided acceleration in drop of the acid concentration occurred until in section A an acid concentration of 2.36% existed. The temperature of the acid bath liquid when fed into section W as referred to was 151° F. The drop in temperature during the flow of the acid bath was fairly constant as indicated by the graph until in section A the temperature had dropped to 111° F.

In section A of the water treatment portion of trough 26 as indicated at the extreme right of the graph of Figure 6, the relative acidity of the liquid was determined by means of methyl orange indicator in terms of relative values as 52.4 in the first section A, 37.5 in the second section B and 20.2 in the third section C. Continuing through baths D, E, F and G with the methyl orange indicator, the alkalinity of these respective baths was found to be 5.15, 7.58, 9.65 and 9.98. The water fed to section G of the water treatment portion of the trough had a pH of 10.58 which dropped slightly to 10.51 in its counter-current movement with respect to the threads in section F. Further drop occurred in the pH between section F and section D, the pH in section D being 9.59 and thereafter a drop occurred such that in section C the pH was 2.19, the reduction in the pH between sections C and A tapering off with the pH in section A being 1.79.

The water as fed to section G was at a temperature of 149.5° F. and the temperature drop during the passage of the water to section A was generally constant, the temperature of the bath in section A being 130.5. The water supply available for the operation herein described had an alkalinity as indicated in the graph.

During the operation as described, the circulation of the liquids within the respective bath bodies between the dams was observed by the addition of methyl orange, benzidine, chlorhydrate, sawdust; potassium ferrocyanide was also utilized. In Figures 4 and 5 two sections of the trough are illustrated together with the movement of the liquid as observed during the operation. It was observed as shown in Figure 5, that above each of the dams 37 a low wall of liquid existed, in which wall the liquid seemed to be substantially quiescent. At least the movement of liquid within the wall was not such as to interrupt the continuity of the wall surface.

When methyl orange indicator was placed in the lower section a sharp dividing line occurred above the dam and substantially no noticeable amount of methyl orange color was carried over by the threads into the upper bath body, thus indicating that the liquid in the respective sections defined between adjacent dams is carried over into an adjacent upper section to a negligible extent, if at all. On the other hand, since the dilute acid was flowing generally counter-current to the passage of the threads, the liquid passed in a downward direction through the staggered openings at the bottoms of the respective dams as well as over the dams adjacent the side edges of the trough. It was observed also that within each of the sections two generally localized, but agitated, circuits of the liquid were established. These circuits are generally indicated by arrows in both Figures 4 and 5. These localized circuits seemed to be depressed toward the bottom of the trough adjacent the respective side walls thereof while the inner paths of each circuit moved generally in the direction of thread travel and were slightly elevated from the bottom of the trough. Additionally, across the entire width of the thread path a noticeable agitation or "kick back" occurred just in advance of the dam. The addition of the indicators to the bath bodies showed the intensity of the circulation of liquid within each body by the constant distribution of the indicator throughout the entire body. Due to this agitation sediment was largely kept in motion and swept along with the liquid constituting the respective bath bodies, through the dam openings and thus through the entire trough to be discharged with the waste bath liquids. The characteristics of the flow and of the circulation of the liquids as described above was further confirmed by the use of the other indicators mentioned in the various sections of the trough where copper was predominant as well as in the water bath where acid was predominant.

While as indicated the localized liquid currents generally resembled side-by-side miniature whirlpools flowing in a pattern of the character generally indicated in Figure 4, the inner fringes of the currents appeared to intermix. The intensity of the whirling turbulence caused in the liquid bodies by these whirlpool-like movements served to insure thorough liquid treatment of the threads passing through the upper portions of the liquid bodies. It has been observed that the use of unperforated dams, or dams inclined in a direction opposite to that herein illustrated, resulted in less complete thread treatment. In the latter case the whirlpools were different in pattern. The whirlpool formation in the preferred operation prevented stagnant repose as well as any mere passive downward flow of the liquid beneath the threads.

In the embodiment example discussed above and as shown in Figures 4 and 5, two whirlpool-like liquid circuits were observed in the dam-defined trough sections when dams provided with apertures shaped as shown were used.

Insofar as it was observable each of the localized currents existed generally in the form of an upper relatively shallow portion adjacent the threads which flowed at a relatively rapid speed in the direction of thread travel. Below this upper relatively narrow portion and in that area beyond the group of threads near the respective sides of the trough the flow was counter-current to the direction of travel of the threads and at a relatively lower speed. It appears that the threads act to propel the liquid upwardly of the trough and that the kick back and the flow of the treating liquid over the dams adjacent the trough sides, together with the flow of liquid through the dam openings and the inclination of the trough, are the factors which cause the larger and relatively slower flow of the liquid downwardly of the trough. The finished thread produced following the example set forth above was substantially pure regenerated cellulose and the following table illustrates the degree of improvement achieved, comparison being made to yarn produced according to conventional methods.

|  | Continuous Yarn | Discontinuous Yarn |
| --- | --- | --- |
| Dry strength per 100 den., g | 200 | 175 |
| Wet strength per 100 den., g | 117 | 98 |
| Elongation, percent | 12-15 | 2-15 |
| Resistance to Abrasion | high | medium |

In general a number of factors, viz., the flow, volume, and characteristics of liquid in the troughs, the tilt of the latter, the position of the dams, the speed, denier and spacing of the threads passing through the troughs and the number, shape and location of the apertures in the dams affect the type of liquid motion in the bath and the maintenance of sharply different chemical conditions between the successive bodies of the liquids. The number, shape and location of the apertures in the dams, materially affect the number and location of the whirlpools. This method of control may be termed "patterning" the circuits of the liquid bodies to produce the desired conditions for the treatment of a given type of thread.

Viscose rayon has also been produced in accordance with this invention. In producing viscose rayon by the practice of the present invention, a viscose spinning solution was extruded through a plurality of spinnerets into an acid spin bath of conventional composition and the resulting filaments were coagulated and regenerated. A plurality of threads so produced were arranged in closely spaced, parallel relationship in the form of a thread band and, in such form, were passed through a series of interconnected bodies of treating liquid. The liquid bodies were maintained in a trough of the general character disclosed in Figures 2b–2e, inclusive, and Figures 3b–3e, inclusive, referred to above with respect to the example of producing cuprammonium yarn. The liquid flowed generally counter-current to the thread travel and localized currents were established. It was found, particularly in the production of tire yarn of heavy denier, that the process was efficient in that the yarn was adequately treated in a relatively short distance of travel. In the practicing of the viscose rayon process in accordance with this invention, the treating liquids in the trough may be of the character normally used in the after-treatment of viscose rayon produced by the bobbin and pot spinning processes.

The process of the present invention, when used in the production of viscose, may be continuous and the group or band of yarns or threads may be collected on a beam or the threads may be dried, twisted, and individually collected. If desired, viscose rayon may be produced in a semi-continuous manner in that, after treatment in a trough, the individual threads may be collected on bobbins or the like and subjected to further after-treatment in package form.

While reference has been made to the present process as practiced with the conventional extrusion of viscose threads into an acid spin bath, it is apparent that it may be used where the viscose solution is extruded in funnels through which the coagulating medium is passed in the same manner that the water is flowed in the cuprammonium process.

Since the trough of the present invention avoids subjecting threads treated therein to strains and frictional drag, it finds its primary utility in the continuous manufacture of synthetic thread. The trough herein disclosed may be advantageously used in the treatment of other types of threads and in the treatment of synthetic threads produced in equipment separate and distinct from the present invention, the treating liquid being selected in accordance with the particular process involved.

Although the inclination of the trough in the example set forth, and the arrangement, construction and the angular disposition of the dams illustrated, appears to afford the most efficient results, the illustration of one specific form of apparatus and the setting forth of one specific process performed therein is not intended to limit the scope of the invention. It has been found that, under some conditions of operation the dams may be formed with the numbers of openings varying from the numbers set forth in the illustration. Similarly the openings in the dams may be of different sizes and shapes. The relative positions of the dams are also subject to certain variation without destroying the general effect of the process.

The benefits of this invention may be had to a varying degree when troughs of length, depth and width modified from those illustrated are used. Modification may likewise be made in the spinning, drying and collecting mechanisms. The quantities of treating liquids supplied and their chemical and physical characteristics and the nature and number of the threads being produced are subject to variation. Proper correlation of the various features of the process will avoid the necessity of drawing the plastic threads through a path of such extended length as to rupture or damage the same. Then, too, the treatment of several threads simultaneously will result in uniformity of the product. Due to the retarded passage of the treating liquids through the treating zones, prohibitive waste is avoided. The threads should preferably be passed in substantially "straight line flight" in the treating liquids near the upper surface thereof. While the troughs may be materially modified, the preferred process involves the use of one or more elongated, shallow troughs, each separated into a plurality of interconnected sections by dams formed with openings in which the treating liquids flow, under retarded flow conditions, generally counter-current to the direction of thread travel. Thus, chemically different liquid bodies are caused to exist in successive sections of the trough. The preferred process also involves the delivery of such quantities and character of treating liquids, in relation to the speed of travel, denier and number of threads and the inclination of the trough or troughs, and disposition of the dams, that a ridge or low wall of treating liquid extends above the upper edge of each of the dams so that carry-over of treating liquid from a lower into a higher trough section with admixture therewith is substantially avoided. It has been noted that, when a plurality of threads are produced and treated simultaneously, the outside threads of the group subjected simultaneously to treatment may have different dye characteristics from those of the intermediate threads of the group unless the outer threads are moved in a path materially spaced from the walls of the trough or troughs.

If desired, a process practiced in accordance with the broader aspects of this invention or in accordance with the specific example set forth above may involve the discontinuance of the thread treatment as described after completion of any liquid treatment or treatments in the trough or troughs. Such a process might be effectively a semi-continuous process in which individual threads are collected before drying, or substantial twisting, whereby the collected yarn in individual packages may be further treated in the normal manner in order to render it suitable for special uses, some of which require special shrinkage or dyeing characteristics, increased strength, fatigue resistance, etc.

This is a continuation-in-part of my application, Serial No. 664,259, filed April 23, 1946, entitled Process and Apparatus for the Production of Synthetic Thread, now abandoned.

What I claim is:

1. A process of producing synthetic thread and the like which comprises forming a plurality of threads from a spinning solution by funnel spinning, passing the freshly formed threads in parallel relationship in a continuous path slightly inclined upwardly from the horizonal through a plurality of slightly vertically offset bodies of treating liquid adjacent the respective upper surfaces thereof, thereby creating a rapid, generally concurrent flow of the liquid in the upper portions of the bodies for the distance of thread travel therethrough and effecting localized currents in the liquid bodies below the threads, each of the bodies of liquid being in restricted communication with its adjacent lower body in a plane spaced below the threads whereby the liquid in the bodies as a whole flows generally countercurrent to the movement of the threads and carries suspended impurities therewith, and then passing the parallel threads as thus treated through a heated atmosphere to effect drying thereof, the movement of the threads being effected from a point beyond the heated atmosphere in the direction of thread travel.

2. A process of producing synthetic thread and the like which comprises forming a plurality of multifilament threads from a spinning solution by funnel spinning, passing the freshly formed threads as a thread band composed of closely spaced threads in co-planar transversely horizontal relationship in a slightly upwardly inclined path into and through a plurality of slightly vertically offset liquid treating bodies adjacent the respective upper surfaces thereof, thereby creating a rapid generally concurrent flow of the liquid in the upper portions of the bodies for the distance of thread band travel therethrough and localized currents in the bodies below the thread band, each of the bodies of liquid being in restrictive communication with its adjacent lower body at a plane spaced below the thread band whereby the liquid in the bodies as a whole flows generally countercurrent to the thread movement and carries suspended impurities therewith, and then passing the thread band through a heated zone to effect drying thereof while circulating the atmosphere of said zone to cause each portion of thread in the band passing therethrough to be contacted continuously with said portions of fresh atmosphere.

3. Apparatus for the liquid treatment of thread comprising a thread source, a trough, and means for propelling the thread through the trough, said trough being slightly inclined upwardly in the direction of thread movement, dams subdividing said trough into compartments, said dams having openings therein establishing communication between said compartments, means for feeding a treating liquid into an upper portion of the trough, a liquid outlet in a lower portion of said trough, and means for guiding the thread through the compartments, in contact with the liquid and across the tops of the dams, said dams being upwardly inclined at an angle to the thread path and sloping in the direction of said source, whereby the liquid flows through the trough under retarded flow conditions and the threads cause agitation of the treating liquid in the compartments and draw the same against the underside of the dams to enhance the treating effect.

4. Apparatus for the simultaneous production of a plurality of wet spun threads comprising means for extruding a plurality of threads, draw off means, a treating liquid trough in the thread path intermediate said extruding means and said draw off means, means supporting said trough at a slight upward slope in the direction of said draw off means, means for introducing a treating liquid at an upper portion of the trough and for withdrawing a liquid at a lower portion thereof and a plurality of dams within the trough and extending thereacross so as to impede the liquid flow in the trough, all of said dams being of equal height and having apertures therethrough adjacent their respective bases and in operation coacting with the inclination of the trough and the introducing means to maintain intercommunicating treating liquid bodies of predetermined depth within the trough, means guiding the threads in closely spaced parallel relationship through said trough across the tops of said dams and in surface contact with the liquid in the trough, said dams functioning with said trough and the moving thread to cause the threads to pass through walls of liquid in their movement through the trough.

5. A machine for the continuous production of synthetic thread comprising a plurality of means for continuously spinning threads, a driven temporary collecting roller spaced from the spinning means, an elongated shallow trough positioned at right angles to the axis of the collecting roller, a plurality of dams extending across the bottom of the trough in spaced relation to each other, said dams being of lesser height than the sides of the trough and having apertures therein adjacent the bottom of the trough, means supporting said trough at a slight upward slope in the direction of said collecting roller, means for feeding liquid to the trough at an elevation such that the liquid will flow downwardly through and over the dams, means beyond the dams for drawing the threads across the tops of the dams, and means for guiding the threads collectively in spaced, coplanar relationship in the trough.

6. A machine for the continuous production of synthetic thread comprising a plurality of means for continuously spinning bundles of filaments, means for guiding the bundles in separated parallel coplanar relationship, a driven temporary collecting roller spaced from the spinning means, an elongated shallow trough positioned at right angles to the axis of the collecting roller, a plurality of dams extending across the bottom of the trough in spaced relationship to each other, said dams being of lesser height than the sides of the trough and having apertures therein adjacent the bottom of the trough, means for feeding liquid to the trough at an elevation such that the liquid will flow downwardly through and over the dams, means beyond the dams for drawing the bundles across the tops of the dams, drying means in the thread path intermediate said trough and said drawing means, and means for guiding the bundles collectively in spaced, coplanar relationship in the trough and in the drying means.

7. A machine for the continuous production of synthetic thread comprising a plurality of means for continuously spinning threads, thread collecting means, an elongated shallow trough positioned in the thread path intermediate said spinning means and said collecting means, a plurality of sloping dams extending across the bottom of the trough, said dams having apertures below the upper surfaces thereof, means for feeding liquid to the trough at an elevation such that the liquid will flow downwardly through and over the dams, and means for guiding the threads collectively in spaced, coplanar relationship across the tops of the dams.

8. A process of producing synthetic thread and the like comprising establishing a row of immediately adjacent bodies of treating liquid having communicating passageways therebetween located below the upper surfaces of the bodies, the surface of each of which is slightly upwardly offset in one direction with respect to the surface of its adjacent preceding body, extruding a spinning solution to form a plurality of threads, moving the freshly formed threads as a thread band composed of closely spaced parallel threads in a path passing through said row of liquid bodies immediately adjacent their respective upper surfaces in the direction of elevation of the bodies, delivering a treating liquid to an upper body and passing the liquid downwardly through succeedingly lower bodies by overflowing the same into each next adjacent lower body and by flowing the same through said passageways, said band of closely spaced parallel threads being caused to move from a point beyond the treating bodies and the path of movement thereof being in the plane of overflow between the respective adjacent bodies, and controlling the delivery of the treating liquid to maintain the flow of the same within the several bodies correlated with the speed of travel of the thread band to thereby substantially prevent the carryover of the liquid with the thread band from a lower liquid body to an adjacent upper liquid body.

9. A process of producing synthetic thread and the like comprising establishing a row of immediately adjacent bodies of treating liquid having communicating passageways therebetween located below the upper surfaces of the bodies, the surface of each of which is slightly upwardly offset in one direction with respect to the surface of its adjacent preceding body, establishing a source of a plurality of threads, moving the threads as a thread band composed of closely spaced parallel threads in a path passing through said row of liquid bodies immediately adjacent their respective upper surfaces in the direction of elevation of the bodies, delivering a treating liquid to an upper body and passing the liquid downwardly through succeedingly lower bodies by overflowing the same into each next adjacent lower body and by flowing the same through said passageways, said band of closely spaced parallel threads being caused to move from a point beyond the treating bodies and the path of movement thereof being in the plane of overflow between the respective adjacent bodies, and controlling the delivery of the treating liquid to maintain the flow of the same within the several bodies correlated with the speed of travel of the thread band to thereby substantially prevent the carryover of the liquid with the thread band from a lower liquid body to an adjacent upper liquid body.

10. A process of producing synthetic thread and the like comprising establishing a row of immediately adjacent bodies of treating liquid having communicating passageways therebetween located below the upper surfaces of the bodies, the surface of each of which is slightly upwardly offset in one direction with respect to the surface of its adjacent preceding body, extruding a spinning solution to form a plurality of threads, moving the freshly formed threads as a thread band composed of closely spaced parallel threads in a path passing through said row of liquid bodies immediately adjacent their respective upper surfaces in the direction of elevation of the bodies, delivering a treating liquid to an upper body and passing the liquid downwardly through succeedingly lower bodies by overflowing the same into each next adjacent lower body and by flowing the same through said passageways, said band of closely spaced parallel threads being caused to move from a point beyond the treating bodies and the path of movement thereof being in the plane of overflow between the respective adjacent bodies, controlling the delivery of the treating liquid to maintain the flow of the same within the several bodies correlated with the speed of travel of the threads to thereby substantially prevent the carryover of the liquid with the thread band from a lower liquid body to an adjacent upper liquid body and continuously drying the threads after the band passes beyond the liquid bodies.

11. A process of producing synthetic thread and the like which comprises forming a plurality of multifilament threads from a spinning solution and passing the freshly formed threads as a thread band composed of closely spaced threads in co-planar transversely horizontal relationship in a slightly upwardly inclined path into and through a plurality of slightly vertically offset liquid treating bodies adjacent the respective upper surfaces thereof, thereby creating a rapid generally concurrent flow of the liquid in the upper portions of the bodies for the distance of thread band travel therethrough and localized currents in the bodies below the thread band, each of the bodies of liquid being in restrictive communication with its adjacent lower body at a plane spaced below the thread band whereby the liquid in the bodies as a whole flows generally countercurrent to the thread movement and carries suspended impurities therewith.

12. A machine for the continuous production of synthetic thread comprising a plurality of means for continuously supplying a plurality of threads, a collecting roller, an elongated shallow trough positioned at right angles to the axis of the collecting roller, a plurality of dams extending across the bottom of the trough in spaced relation to each other, said dams being of lesser height than the sides of the trough and having apertures therein adjacent the bottom of the trough, means supporting said trough at a slight upward slope in the direction of said collecting roller, means for feeding liquid to the trough at an elevation such that the liquid will flow downwardly through and over the dams, means beyond the dams for drawing the threads across the tops of the dams, and means for guiding the threads collectively in spaced, coplanar relationship through the trough.

13. A machine for the continuous production of synthetic thread comprising means for continuously supplying a plurality of threads, an elongated shallow trough, a plurality of dams extending across the bottom of the trough in spaced relation to each other, said dams being of lesser height than the sides of the trough and having apertures therein adjacent the bottom of the trough, means supporting said trough at a slight upward slope in a direction away from the means for supplying the threads, means for feeding liquid to the trough at an elevation such that the liquid will flow downwardly through and over the dams, means beyond the dams for drawing the threads across the tops of the dams, and means for guiding the threads collectively in spaced, coplanar relationship through the trough.

HUGO HOFMANN.

REFERENCES CITED

The following references are of record in the file of this patent:

UNITED STATES PATENTS

| Number | Name | Date |
|---|---|---|
| 1,651,229 | Schubert | Nov. 29, 1927 |
| 1,910,879 | Bernstein | May 23, 1933 |
| 2,251,931 | Gudelfinger | Aug. 12, 1941 |
| 2,334,325 | Heim | Nov. 16, 1943 |

FOREIGN PATENTS

| Number | Country | Date |
|---|---|---|
| 379,935 | France | July 15, 1907 |
| 209,923 | Germany | Aug. 25, 1908 |
| 531,533 | France | Oct. 26, 1921 |
| 460,079 | Great Britain | Jan. 20, 1937 |
| 515,127 | Great Britain | Nov. 27, 1939 |